May 25, 1943.   T. BIRKENMAIER   2,320,026
TIME-DELAY SWITCH RECLOSER
Filed Nov. 14, 1940   5 Sheets—Sheet 1

Theodore Birkenmaier,
Inventor.
Haynes and Koenig
Attorneys.

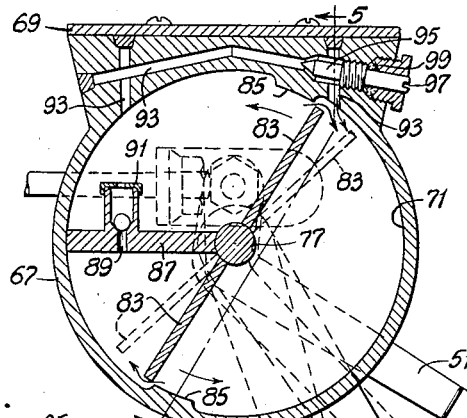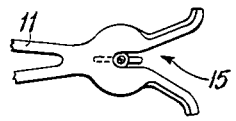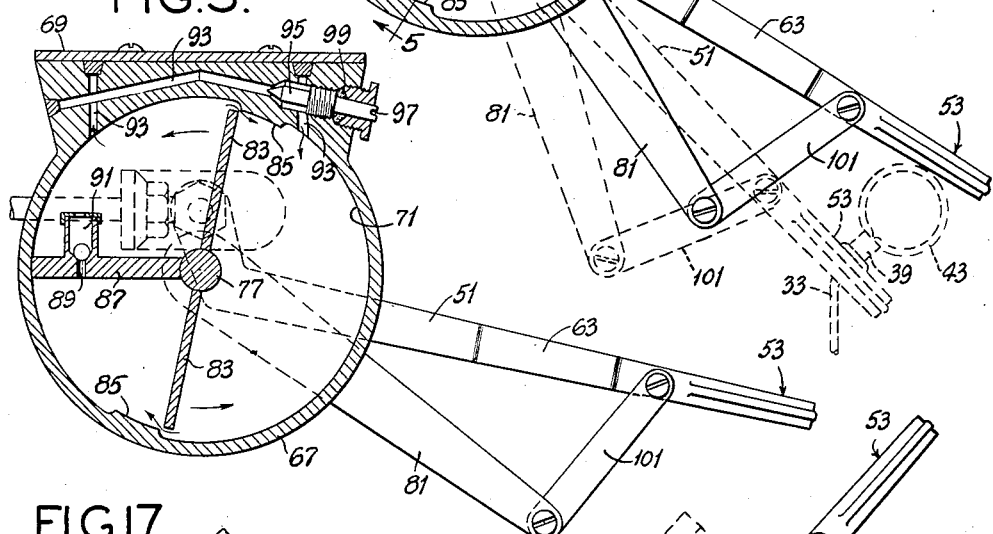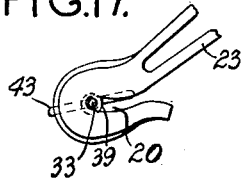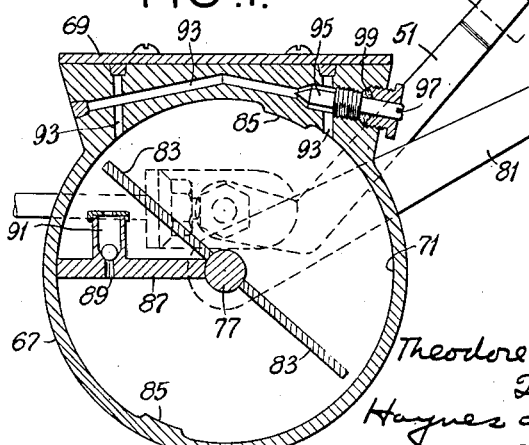

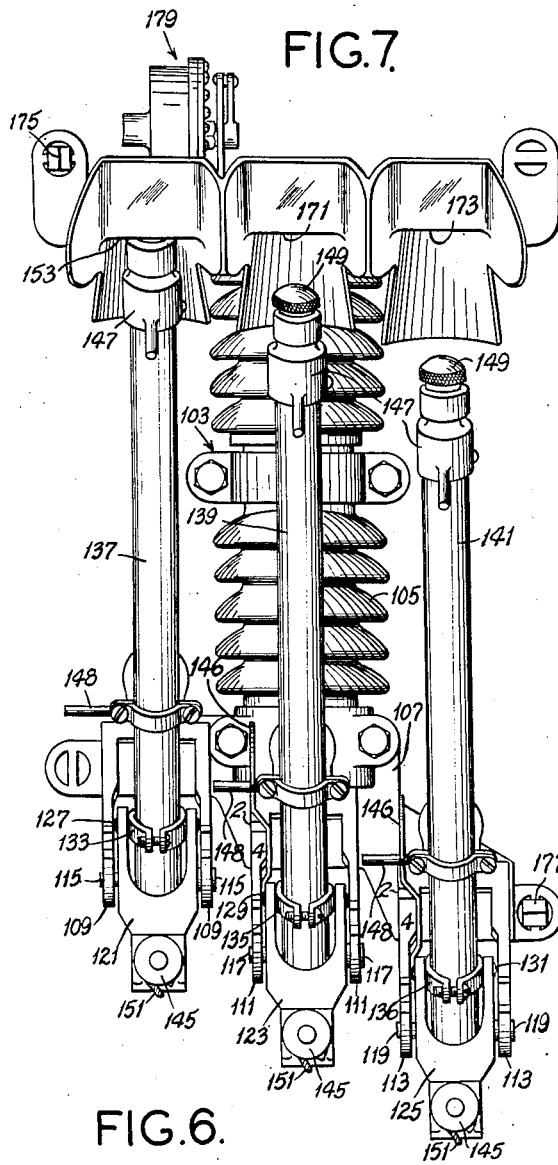
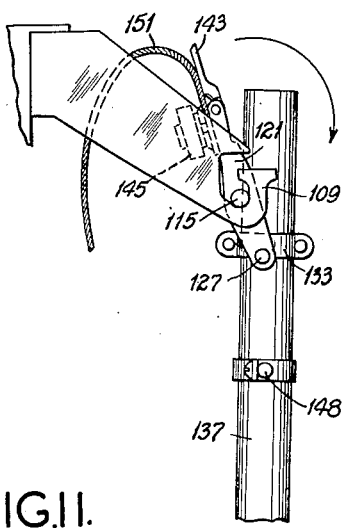
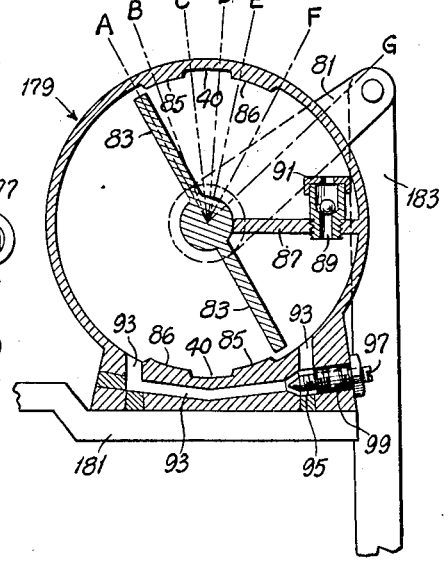
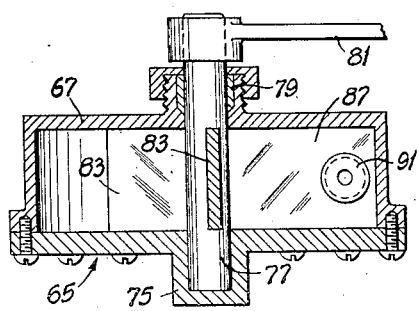

May 25, 1943.  T. BIRKENMAIER  2,320,026
TIME-DELAY SWITCH RECLOSER
Filed Nov. 14, 1940   5 Sheets-Sheet 4
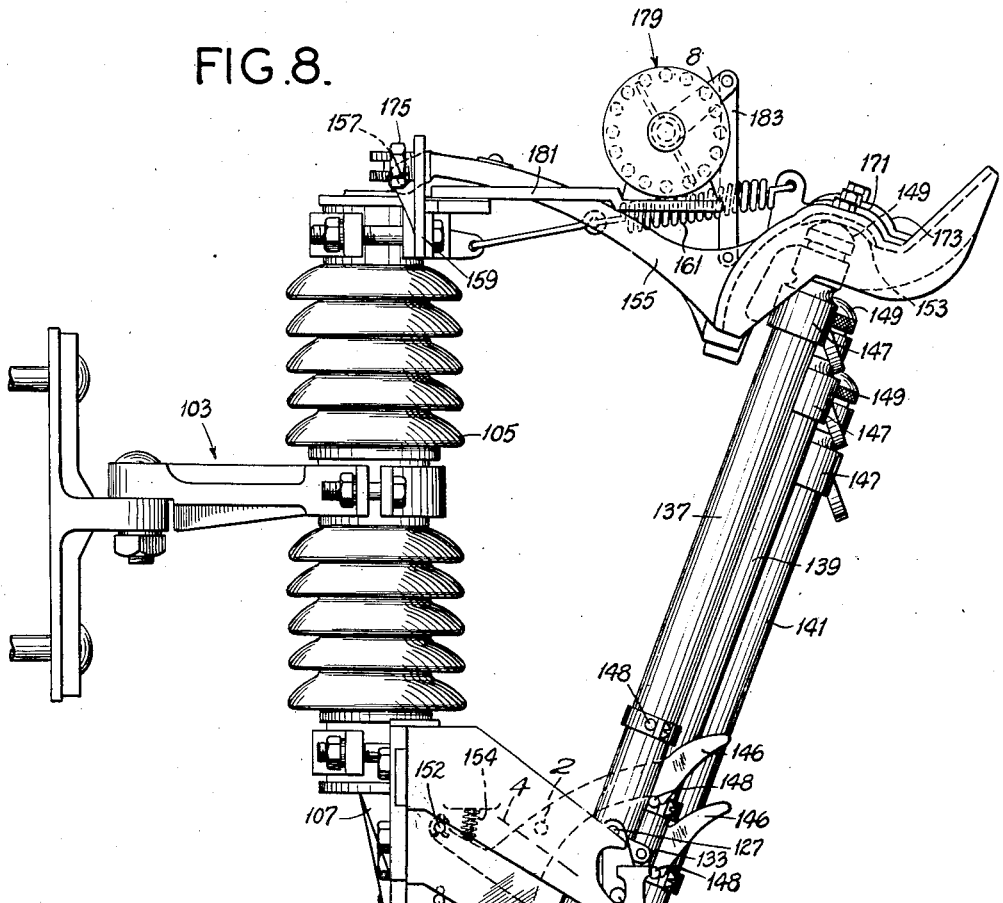
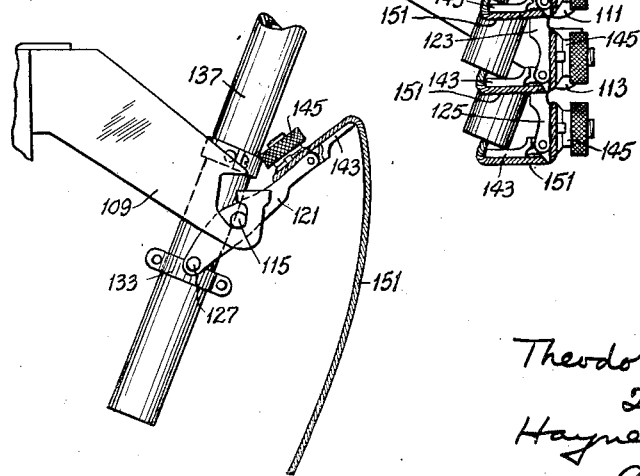
Theodore Birkenmaier,
Inventor.
Haynes and Koenig,
Attorneys.

May 25, 1943. T. BIRKENMAIER 2,320,026
TIME-DELAY SWITCH RECLOSER
Filed Nov. 14, 1940 5 Sheets-Sheet 5
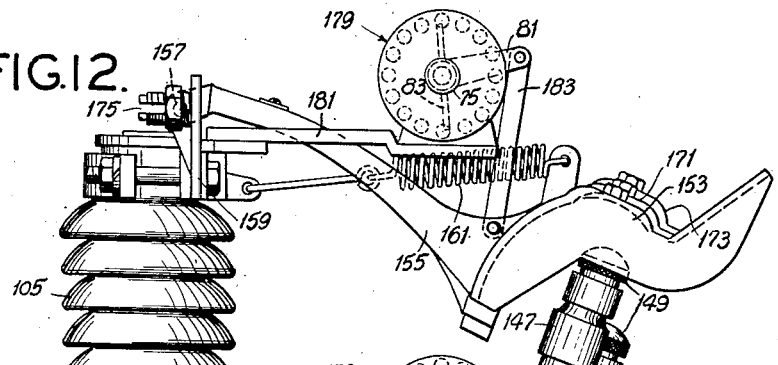
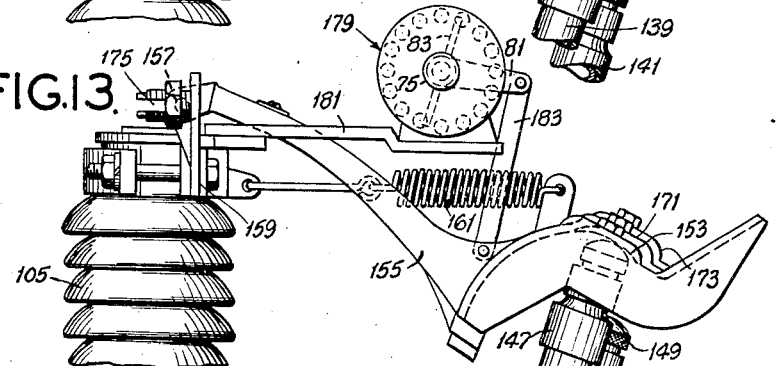
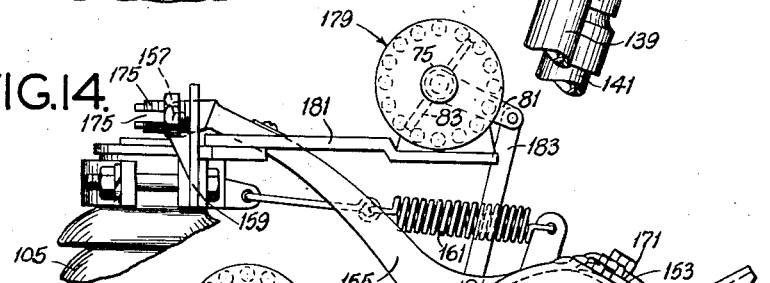
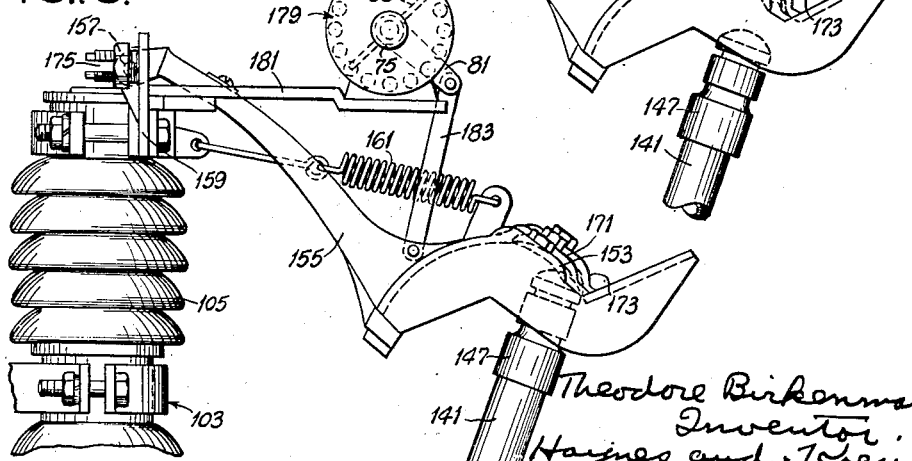
Theodore Birkenmaier, Inventor.
Haynes and Koenig, Attorneys.

Patented May 25, 1943

2,320,026

UNITED STATES PATENT OFFICE 2,320,026

TIME-DELAY SWITCH RECLOSER

Theodore Birkenmaier, St. Louis, Mo., assignor to W. N. Matthews Corporation, St. Louis, Mo., a corporation of Missouri Application November 14, 1940, Serial No. 365,578

7 Claims. (Cl. 200—126)

This invention relates to a time-delay switch recloser, and with regard to certain more specific features, to time-delay reclosers for repeater fuse switches.

Among the several objects of the invention may be noted the provision of a simple form of time-delay apparatus which may readily be adapted to various designs of repeater fuse switches and the like; the provision of apparatus of the class described which, when a fuse blows, will permit of instantaneous separation of the fuse ends and thereafter a time-delayed action, with a final snap action for reclosing a circuit contact through another available fuse; the provision of apparatus of the class described which may readily be designed for multiple reclosure fuse switches without substantial complication; and the provision of apparatus of this class which is readily adjustable to suit various desired time-delay periods. Other objects will be in part obvious and in part pointed out hereinafter.

The invention accordingly comprises the elements and combinations of elements, features of construction, and arrangements of parts which will be exemplified in the structures hereinafter described, and the scope of the application of which will be indicated in the following claims.

In the accompanying drawings, in which are illustrated several of various possible embodiments of the invention, Fig. 1 is a front elevation of a fuse switch of the single reclosure type, showing one form of time-delay mechanism;

Fig. 2 is a vertical section of the time-delay mechanism per se of Fig. 1, showing in dotted lines a first fuse-connected position, and in solid lines a first released position;

Fig. 3 is a view similar to Fig. 2 showing a succeeding position after time-delay has been consummated;

Fig. 4 is a view similar to Fig. 3, showing a succeeding position after quick switch-closing action has occurred, the solid-line position of the arm being in correspondence with the dotted-line position shown in Fig. 1;

Fig. 6 is a horizontal section taken on line 6—6 of Fig. 1;

Fig. 7 is a front elevation of another form of the invention applied to a multiple reclosure fuse switch;

Fig. 8 is a side elevation, viewed from the left of Fig. 7;

Fig. 9 is a fragmentary view of a lower end of a fuse holder shown in a preliminary dropped position and translated downward without substantial rotation;

Fig. 10 is a view similar to Fig. 9 showing said fuse holder in a final rotated dropped position;

Fig. 11 is a vertical section of the time-delay mechanism, as illustrated in Figs. 7 and 8;

Figs. 12–15 are fragmentary views similar to portions of Fig. 8, showing successive positions of the time-delay mechanism in accordance with successive reclosure functions;

Fig. 16 is a fragmentary cross section taken on line 16—16 of Fig. 1;

Fig. 17 is a fragmentary cross section taken on line 17—17 of Fig. 1; and

Similar reference characters indicate corresponding parts throughout the several views of the drawings.

Figure 1:
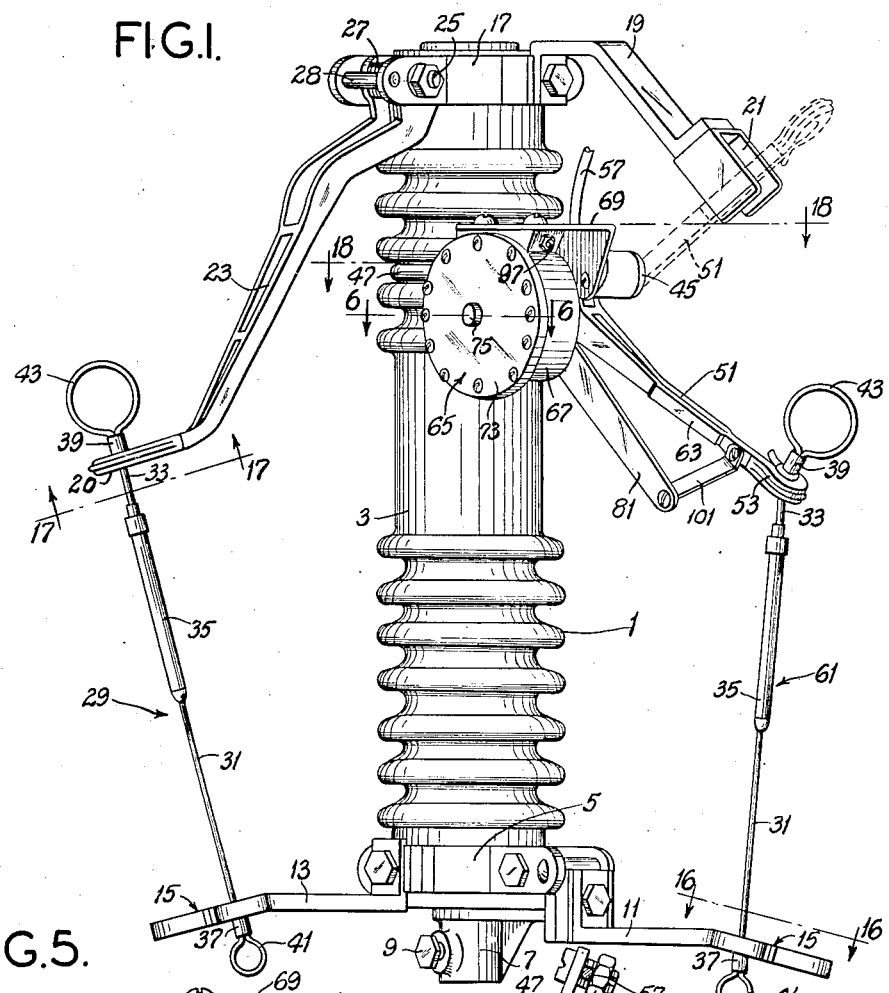
Figure 5:
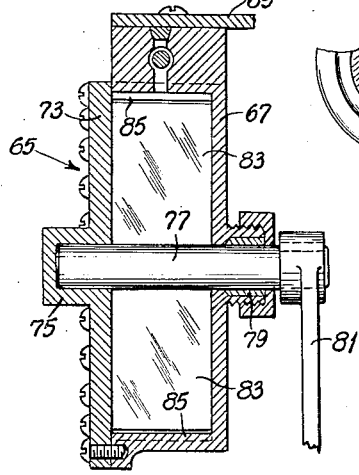
Fig. 5 is a cross section taken on line 5—5 of Fig. 2.
Figure 18:
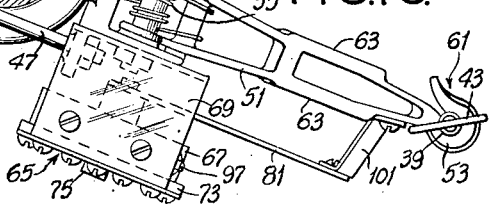
Fig. 18 is a horizontal section taken on line 18—18 of Fig. 1.

Referring now more particularly to Fig. 1, there is shown at numeral 1 an insulator which is supported upon a suitable bracket (not shown) fastened at the waist 3, or it may be supported from a bushing 7 at its lower end, as will appear.

At its lower end the insulator 1 has clamped thereto a conducting band 5 which is in conductive relationship with said bushing 7. The bushing is adapted for fastening on the conducting portion of a transformer connection or the like, the fastening being made by means of a set screw such as shown at 9. From the band 5 extend two fixed and rigid conducting arms 11 and 13. Each of these conducting arms is provided with a wedge-shaped receiving notch 15, which is better indicated for example in Fig. 16.

At its upper end the insulator 1 carries a second conducting band 17 from which extends one fixed and rigid conducting arm 19 having at its end a set of spring contact blade-receiving clips 21. The rigid arm 19 is in the plane of the rigid arm 11, and in the plane of a movable switch blade or arm 51 (to be described).

The conducting band 17 also carries a rigid conducting arm 23, which, however, is rotary on a pivot 25 and is normally biased upward by a coil spring 27. This arm 23 moves in the plane of arm 13. The end of the arm 23 is hook-shaped as indicated at 29 (see also Fig. 17). A pin 28 acts as a limiting stop. The upward bias on the arm 23 is resisted by the interposition of a fuse link, indicated generally by numeral 29. This link has two flexible conducting wire leads 31 and 33 connected by a fusible separating section 35. Associated with the conducting leads 31 and 33 are conducting collars or enlargements 37 and 39, respectively. Attached to the collars 37 and 39 are rings or handles 41 and 43, respectively.

By placing leader 33 in hook 20 with collar 39 above the hook, the arm 23 may be drawn down against its bias and then so held by placing collar 37 below the notch 15 in arm 13 with lead 31 in said notch 15. This condition is shown in Fig. 1.

At 45 is shown a conducting bracket which is held to a mid portion of the insulator 1 by means of a U-bolt 47. Pivoted at 49 to the bracket 45 is the rotary rigid conducting arm 51 having a hook-shaped end 53. By means of coil spring 55, the arm 51 is normally biased upward to a position wherein a blade portion 63 will cooperate with the spring clip 21. A line wire 57 connected at 59 serves to bring current to the conducting member 45 and the arm 51.

The arm 51 is held downward against its normal upward bias by means of another fuse link indicated generally at 61, and consisting of parts which are similar to those of the fuse link 29 and are correspondingly numbered. With leader 33 in hook 53 and collar 39 above it, the arm 51 may be drawn down against its upward bias and so held by inserting leader 31 in notch 15 of arm 11, with the collar 37 therebelow.

Operation without any time-delay features would be as follows:

Current passing in from the line 57 would pass through the arm 51, fuse link 61, arm 11 and to the sleeve 7, thus completing an otherwise closed circuit. No current would flow to the arm 19.

Upon abnormal conditions which would cause dividing at the fusible element 35, the leaders 33 and 31 of the fuse link 61 would be separated, and the arm 51 would bias upward with a quick action so that the flat blade portion 63 thereon would come into conducting engagement with the conductor clip 21, thus feeding current through the arm 19, member 17, arm 23, fuse link 29, arm 13, and again to the conducting member 7. If the abnormal conditions by this time (the time taken by 51 to swing up) have cleared, then the circuit remains closed until abnormal conditions again occur, whereupon the fuse link 29 may break, thus releasing the arm 23 to bias upward to permanently break the circuit through the device.

In order that some time delay be given to the movement of arm 51, so that some transient abnormality may clear itself, the time-delay mechanism shown generally at numeral 65 is used. This consists of a casing 67 (see also Figs. 2–6) which is attached to the bracket 45 by means of a sub-bracket 69.

The body 67 is interiorly of hollow cup-shape and circular as indicated at 71, and is enclosed by a cover 73. The cover at the center forms a blind bearing 75 for a rotary shaft 77. The other end of the shaft passes through a packing gland 79 in the body 67, and exteriorly is provided with an operating or check lever 81.

Interiorly the shaft 77 carries a pair of oppositely extending vanes 83, the outer ends of which substantially clear the circular interior portion 71, but which have a closer clearance with respect to oppositely located pads 85 established on the circular portion 71. The interior faces of the pads 85 are machined concentrically with the axis of shaft 77. The sides of the vanes are closely fitted to the side walls of 67 and 73. This fit and the one between the ends of vanes 83 and pads 85 are about the same.

On one side of the vanes 83 (the left side in Figs. 2, 3 and 4) a fixed dividing wall 87 is arranged which extends from the wall 71 to the shaft 77. It has therein a port 89 with a check valve 91 which permits free flow only one way while blocking off flow in the opposite direction. This comprises a uni-directional flow passage. The wall 87 has a sliding seal at shaft 77.

A by-pass is formed across one (the upper one) of the pads 85 and consists of a passage 93 connecting opposite sides of the pad. In the passage 93 is a threaded needle valve 95 controllable from the exterior by a screw-driver notch 97. A suitable packing gland 99 is used to prevent leakage from the by-pass 93.

The compartment 71 and passage 93 are filled with a non-freezing fluid of substantially constant viscosity at all expected temperatures, for example, with a fluid such as the well-known hydraulic-brake fluid.

The arm 81 of the time-delay mechanism is coupled with the switch arm 51 by a link 101. The upward biasing action of the switch arm 51 is such as to move the arm 81 in a counterclockwise direction (Figs. 2, 3 and 4). The operation of the time-delay mechanism is as follows, starting with the dotted-line position shown in Fig. 2:

The fuse link 61 being initially intact holds the arm 51 down in the dotted-line position of Fig. 2, thus throwing the time-delay arm 81 into the dotted-line position, wherein the vanes 83 are in their dotted-line positions angularly spaced from the pads 85. This condition of parts is shown in solid lines in Fig. 1. When the fuse 61 blows and releases the arm 51, its upward bias through connection 101 draws along the arm 81, and thus quickly rotates the vanes 83 counterclockwise to the solid-line position shown in Fig. 2. This is a quick action because of the relatively large clearance between the ends of the vanes 83 and the interior circular form 71. Thus the released fuse leaders 31 and 33 are jerked apart (as is desirable) during the first part of the reclosure movement.

As the vanes 83 approach the pads 85, the free transfer of fluid from one side to the other of the vanes ends, and substantial liquid throttling occurs between the ends of the vanes 83 and the pads 85 as the pads are angularly traversed. Thus the movement of the arm 81 from about the solid-line position of Fig. 2 to the solid-line position of Fig. 3 is slower according to the time-delay desired. Transfer of fluid cannot occur through the now-closed check valve 91 in the wall or diaphragm 87. The position of the arm 51 of Fig. 3 is one wherein it is still substantially clear of the spring clip 21 wherein the circuit has not yet been reclosed.

Next, as the vanes 83 leave the pads 85, they again come into more free end-clearance relationship with respect to the circular form 71 and liquid freely passes around their ends so that the linkage including the arms 81 and 51 suddenly springs from the position shown in Fig. 3 to the position shown in Fig. 4. This occurs with a sudden snap action wherein the blade 63 is definitely driven into the spring clip 21 as shown by the solid lines in Fig. 4 and by the dotted lines in Fig. 1. This recloses the circuit after a time delay, and the current then passes through the second fuse link 29.

In order to make adjustable the amount of time delay brought about by passage of the vanes 83 across pads 85 from the Fig. 2 to the Fig. 3 position, the needle valve 95 of the by-pass 93 may be adjusted so that the friction of liquid flow across the upper pad 85 is eliminated in varying degrees. For example, for clearance of .001" between the end of the vanes 83 and pads 85 and for a suitable spring 55 for proper switch-closing action, the needle valve 95 may be adjusted for reclosure in 60 cycles in an ordinary 60-cycle A. C. system. The needle valve 95 of course also provides for adjusting against inaccuracies in manufacture.

The purpose of the check valve 91 is to permit more free flow of fluid from one side of the wall or diaphragm 87 to the other upon clockwise rotation of the vanes 83 so that during such action substantial transfer of fluid is not required between the ends of the vanes 83 and the pads 85. This is to provide for quick resetting of the linkage when the arm 51 is drawn down preparatory to replacing the broken fuse 61.

It is clear that the whole device of Fig. 1 may be inverted for installation. Also, if desired each of the pads 85 may be by-passed by an adjustable arrangement such as 93, 95.

Referring to Figs. 7-15, the invention is shown as adapted to a multiple reclosure switch of the general class shown in my United States patent application, Serial No. 194,791, filed March 9, 1938, for Electric switches, eventuated into Patent 2,240,253, dated April 29, 1941. The present disclosure indicates a few changes in detail over the switch parts shown in the former structure, and a brief description will therefore be given, prior to describing the connected time-delay features.

Referring to Figs. 7 and 8, there is shown at numeral 103 a bracket supporting insulator 105. At the lower end of the insulator is a conducting bracket 107 which carries three pairs of receiving sockets 109, 111 and 113 in descending order, for receiving pairs of gudgeons 115, 117 and 119. These gudgeons are located on rotary conducting legs 121, 123 and 125, pivoted at 127, 129 and 131, respectively, to clamps 133, 135 and 136 of fuse-containing tubes 137, 139 and 141, respectively.

Each lever 121, 123 and 125 carries a spring-biased arm 143 and a connector 145. At the top each fuse holder carries a conducting head 147 in which is threaded a removable, but enclosing, conducting cap 149. In the usual way a fuse link 151 is held by means of each cap 149 and threaded through the respective fuse holder tube 137, 139 or 141, and around the lower biasing members 143 to be fastened to the respective connector 145. Thus each rotary supporting member or lever 121, 123 and 125 is held against its respective fuse tube 137, 139 or 141, and thus each makes a collapsible fuse holder unit which may be placed in sockets 109, 111 or 113 and rotated around the respective gudgeons 115, 117 or 119, so that the fuse holders may be rotated into the positions shown in Figs. 7 and 8.

For holding up the fuse holders 139 and 141, latches 146 are used which cooperate with gudgeons 148. A gudgeon is also shown on the fuse holder 137, but, since as will be shown, it is unnecessary to hold this fuse holder by means of a latch, it has no function. It is simply shown because it is the intention that all fuse holder assemblies shall be alike and interchangeable. Each latch 146 is pivoted at 152 and is biased downward to holding position by a respective spring such as indicated for example at 154.

The first fuse holder 137 is held up by reason of its conducting cap 149 resting in a first socket portion 153 of an upper contact arm 155. The arm 155 is pivoted at 157 to an upper conducting bracket 159 and is biased downward by a spring 161. Since arm 155 rests upon the top of the highest fuse holder 137, it is out of contact with the tops of the lower ones 139 and 141. The biasing action on the first fuse holder, and thereafter on the others, as will be shown, tensions the respective fuse link in the respective holder because of the tendency to rotate the respective lever 121, 123 or 125.

The arm 155 serves for effecting multiple reclosure operations and for this purpose is provided with a second recess 171 and a third recess 173, these being arranged successively to contact with the caps 149 of the successive fuse holders 139 and 141.

Operation without the time-delay features is as follows:

Current brought to the upper arm 155 at a suitable connection 175 passes through the arm 155, through the fuse link 151 of the first fuse holder 137, leg 121, socket 109 and to the conducting bracket 107, from whence it passes out to a suitable line at a connection 177. When the fuse in the first fuse holder 137 blows, this separates the ends of the fuse 151, which releases the drop-out lever 121. This causes the fuse holder 137 first to descend or drop down as shown in Fig. 9, and then to rotate down or drop out into the position shown in Fig. 10. This withdraws the respective conducting cap 149 from its socket 153. Thereupon the spring 161 biases the arm 155 downward so that the second socket 171 contacts with the cap 149 of the second fuse holder 139. Thus the circuit is closed from arm 155 through the second drop-out fuse holder, but not the third.

When the fuse link in the second drop-out fuse holder blows, the same kind of operations above described occur, and the second fuse holder drops down and rotates outward, thus breaking contact between the cap 149 and the arm 155. Hence the arm 155 is biased down into contact with the cap 149 of the third drop-out fuse holder 141. Final blowing of the link in the fuse holder 141 results in dropping and rotation of it out of circuit-closing position, to finally open the circuit permanently.

Whenever a fuse holder 139 or 141 drops down and out, its gudgeon 148 clears from under the respective latch 146. After a new fuse is inserted and the fuse holder reapplied and rotated upward, the latches 146 hold the gudgeons 148. The latches are limited in their downward movements by lugs 2 respectively on latches 146 which engage surfaces 4 on extensions from the bracket 7. The extensions referred to are those which in part form the sockets 109, 111 and 113.

The time-delay construction for the switch of Figs. 7 and 8 is shown in detail in Figs. 11-15, and also in Figs. 7 and 8, like numerals designating like parts to those described on Figs. 2-6. However, in this case, the device, which has been indicated generally at numeral 179, is mounted upon an upper bracket 181 and has its control arm 81 connected with the arm 155 by a longer link 183. Also, instead of providing a single set of interior throttling pads 85, another set of pads 86 is used, with spaces 40 between them and the pads 85 (Fig. 11). The by-pass 93 is then placed across two of the pads. Operation of this multiple reclosure form of the invention is then as follows, referring to Figs. 11-15.

Starting with the position of the arm 155 in Fig. 8, which closes the circuit through first fuse holder 137, the vanes 83 are approximately in position A shown in Fig. 11. They are angularly spaced away from the first set of pads 85. When the fuse link 151 of the first fuse holder 137 blows, the fuse holder drops. An initial fairly free action of the vanes 83 from position A to position B of Fig. 11, causes the arm 155 to give a substantial impetus to the downward action of the fuse holder 137. The fuse holder then drops and rotates. This leaves the arm 155 suspended and out of contact with the next fuse holder 139 due to the resistance of the time-delay mechanism (see Fig. 12). This delays the contact of the arm 155 with the second cap 149 of the second fuse holder 139, as brought about by the slower traverse of the vanes 83 over the first set of pads 85.

As the vanes 83 leave the pads 85 they approach the position C wherein they have more free action. Thereupon they drop suddenly from the position C of Fig. 11 to the position D. Position D of the vanes 83 corresponds to the position of arm 155 which is shown in Fig. 13, that is, wherein contact has been suddenly made with the upper end of the second fuse holder 139. This recloses the circuit wit ha snap action. Thus it will be seen that a quick initial dropping action is afforded for giving impetus to the downward action of the fuse holder, then a time-delay action, and finally a quick dropping action wherein the arm approaches contact with the second fuse holder cap at a rapid rate. These quick circuit opening and closing actions are desirable before and after the time-delay action.

Next, if the second fuse holder blows, a similar operation is repeated, the vanes 83 moving quickly from the position D to position E shown in Fig. 11, which gives an initial downward impetus to the blown second fuse holder 139. Thereafter the vanes 83 more slowly traverse the pads 86, moving from position E to position F. At this time the arm 155 is suspended above the third fuse holder 141, as indicated in Fig. 14.

Finally, the vanes 83 reach the ends of the pads 86 at position F (Fig. 11), then being released for quick drop from the position F to the position G of Fig. 11 which corresponds to the contact position of arm 155 with fuse holder 141 shown in Fig. 15. This affords a quick final closure. This last fuse holder 141 is then available in the circuit for blowing at the proper time.

It will be seen that the number of fuse holders and contact sockets may be increased, requiring only for each added reclosure action desired another set of pads, such as one of the sets 85 and 86.

It is clear that if desired another by-pass such as 93 may be used across the non-by-passed pads or sets of pads 85 and 86 if additional adjustment range is desired.

It will also be understood that individual by-passes may be arranged for the respective pads 85 or 86 in Fig. 11 so that different adjustments may be obtained for the respective time delays as between fuse holders 137 and 139 on the one hand, and between 139 and 141 on the other hand.

Features of the invention are as follows:

1. The rotary form of the time-delay mechanism is readily adaptable to various classes of reclosure switches because many switch arms are rotary.
2. Accurate control of reclosure functions is possible, with desirable adjustment possible from time to time.
3. The initial circuit-opening movements are quick and free so that the ends of the fuse link are quickly mechanically separated upon blowing; thereafter the time-delay action occurs; and finally a quick final mechanical movement effects a snap action for reclosure of the circuit. The start and finish of each reclosure movement is in connection with a quick and free, snap-acting mechanical movement.
4. The device is quite compact and economical to manufacture.
5. It has few moving parts subject to derangement.

The two separate radial vane members 83 may be considered to be in effect a single diametrical vane member.

In view of the above, it will be seen that the several objects of the invention are achieved and other advantageous results attained.

As many changes could be made in the above constructions without departing from the scope of the invention, it is intended that all matter contained in the above description or shown in the accompanying drawings shall be interpreted as illustrative and not in a limiting sense.

I claim:

1. A time-delay reclosing fuse switch comprising two fuses, a rotary arm biased so as to connect one at a time of said fuses into a circuit and adapted to move under bias when said one fuse is removed from circuit to connect the second fuse into the circuit, a time-delay device comprising a liquid-containing body having an inwardly extending wall, a vane in the body rotary on a point near the inner end of the wall, the body having a pad portion relatively closely cooperating with the end of the vane throughout a limited angular operation of the vane, a check member rotary with the vane, and means coupling said check member with said biased rotary arm for movement therewith.

2. A time-delay reclosing fuse switch comprising two fuse links, a biased rotary switch arm adapted to tension one of said links and upon separation of the link to move under bias through a predetermined angle to connect a circuit including the other link, a time-delay device for the arm comprising a liquid-containing body having a wall extending in from one side, a vane in the body rotary on a center at the inner end of the wall, the body having a pad portion relatively closely cooperating with the end of the vane throughout a limited angular operation of the vane, a check member outside of the body and rotary with the vane, and means coupling said check member with said biased rotary arm for movement therewith.

3. A time-delay reclosing fuse switch comprising two fuse links, a biased rotary switch arm adapted to tension one of said links and upon separation of the link to move under bias through a predetermined angle to connect a circuit including the other link, a time-delay device for the arm comprising a liquid-containing body which is at least in part circular and having a radial wall through which is a uni-directional flow passage, a vane in the body rotary at a midpoint and on a center at the inner end of the wall, the body having opposite arcuate pad portions relatively closely cooperating with the ends of the vane throughout a limited angular operation of the vane, a check member outside of the body and rotary with the vane, and means coupling said check member with said biased rotary arm for movement therewith.

4. A time-delay reclosing fuse switch comprising two fuse links, a biased rotary arm adapted to tension one of said links and upon separation of the link to move under bias through a predetermined angle to connect a circuit including the other link, a time-delay device comprising a liquid-containing body which is substantially circular and having a radial wall through which is a uni-directional flow passage, a vane in the body rotary on a mid-point thereof and near the inner end of the wall, the body having opposite pad portions relatively closely co-operating with the ends of the vane throughout a limited angular operation of the vane, a check member rotary with the vane, means coupling said check member with said biased rotary arm for movement therewith, and controllable liquid by-pass means around at least one of said pads.

5. A time-delay reclosing fuse switch comprising two fuses, a rotary arm biased so as to connect one at a time of said fuses into a circuit and adapted to move under bias when said one fuse is removed from circuit to connect the second fuse into the circuit, a time-delay device comprising a liquid containing body which is at least in part circular and having a radial wall through which is a uni-directional flow passage, a vane in the body rotary on a point near the inner end of said wall, the body having opposite pad portions relatively closely cooperating with the ends of the vane throughout a limited angular operation of the vane, a check member rotary with the vane, and means coupling said check member with said biased rotary arm for movement therewith.

6. A time-delay reclosing fuse switch comprising three fuses, a rotary arm biased so as to connect one at a time of said fuses into a circuit and adapted to move under bias when one fuse is removed from circuit to connect a next fuse into the circuit, a time-delay device comprising a liquid-containing body having an inwardly extending wall, a vane rotary in the body on a point near the inner end of the wall and at a mid-point of the vane, the body having opposite pairs of pad portions, the pad pairs being spaced angularly, opposite members of each pair of pads relatively closely cooperating with the opposite ends of the vane throughout a limited angular operation of the vane, a check member rotary with the vane, and means coupling said check member with said biased rotary arm for movement therewith.

7. A time-delay reclosing fuse switch comprising three fuses, a rotary arm biased so as to connect one at a time of said fuses into a circuit and adapted to move under bias when one fuse is removed from circuit to connect the second fuse into the circuit, a time-delay device comprising a liquid-containing body which is at least in part circular and having a radial wall through which is a uni-directional flow passage, a vane rotary in the body on a point near the inner end of the wall and at a mid-point of the vane, the body having opposite pairs of pad portions, the pairs being spaced angularly, opposite members of each pair of pads relatively closely cooperating with the opposite ends of the vane throughout a limited angular operation of the vane, a check member rotary with the vane, and means coupling said check member with said biased rotary arm for movement therewith.

THEODORE BIRKENMAIER.